(12) United States Patent
Chang (10) Patent No.: US 12,405,684 B2
(45) Date of Patent: Sep. 2, 2025

(54) TOUCH PANEL, TOUCH SENSITIVE APPARATUS AND METHOD THEREOF AND TOUCH SYSTEM

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 121 days.

(21) Appl. No.: 18/229,341

(22) Filed: Aug. 2, 2023

(65) Prior Publication Data

US 2024/0126388 A1 Apr. 18, 2024

Related U.S. Application Data

(60) Provisional application No. 63/416,955, filed on Oct. 18, 2022.

(51) Int. Cl.
*G06F 3/041* (2006.01)
*G06F 3/044* (2006.01)

(52) U.S. Cl.
CPC ........ *G06F 3/0412* (2013.01); *G06F 3/04144* (2019.05); *G06F 3/0445* (2019.05); *G06F 2203/04102* (2013.01); *G06F 2203/04105* (2013.01)

(58) Field of Classification Search
CPC .. G06F 3/0412; G06F 3/04144; G06F 3/0445; G06F 2203/04102; G06F 2203/04105; G06F 3/04166; G06F 3/0446; G06F 3/0447; G06F 1/1652; G06F 3/0414; G06F 3/041
See application file for complete search history.

(56) References Cited

U.S. PATENT DOCUMENTS

2017/0293379 A1* 10/2017 Lee .................... G06F 3/04166
2024/0220056 A1* 7/2024 Ho .......................... G06F 3/041

* cited by examiner

*Primary Examiner* — Rodney Amadiz
(74) *Attorney, Agent, or Firm* — WPAT, PC (57) ABSTRACT

A touch panel sequentially comprising: a first electrode layer, an elastic dielectric layer, and a second structure, the first electrode layer comprises one or more first electrodes in parallel to a first axis, the second structure comprises multiple second circuits in parallel to a second axis, multiple third circuits in parallel to the first axis, multiple second electrodes, and multiple switch circuits, wherein each of the switch circuits connects one of the second electrodes and one of the second circuits, respectively, wherein each of the switch circuits is configured to connect or disconnect the one of the second electrodes and the one of the second circuits according to signals transmitted from one of the third circuits, wherein each of the first electrodes covers at least one of the third circuits, the switch circuits configured by the at least covered one of the third circuits, and the second electrodes corresponding to the switch circuits.

22 Claims, 9 Drawing Sheets

TOUCH PANEL, TOUCH SENSITIVE APPARATUS AND METHOD THEREOF AND TOUCH SYSTEM

CROSS REFERENCE TO RELATED PATENT APPLICATION

This patent application is based on a provisional patent application No. 63/416,955 filed on Oct. 18, 2022.

FIELD OF THE INVENTION

This application is related to pressure sensing, especially related to pressure sensitive array structure and pressure sensitive processing apparatus and method thereof.

BACKGROUND OF THE INVENTION

Applications of pressure sensing are extensively adopted. Particularly, it is to sense positions and values of pressed points on a planar surface. For example, after examining plantar force being applied to a runner, corrective insoles or shoes may be made according to force variations sensed by a pressure sensitive structure. Or in a training based on science, a pressure sensitive structure may be placed on the ground. When golf or baseball player swings, it can determine whether the dynamic posture of the player is correct based on pressure forces variations of feet sensed by the pressure sensitive structure.

Figure 1:
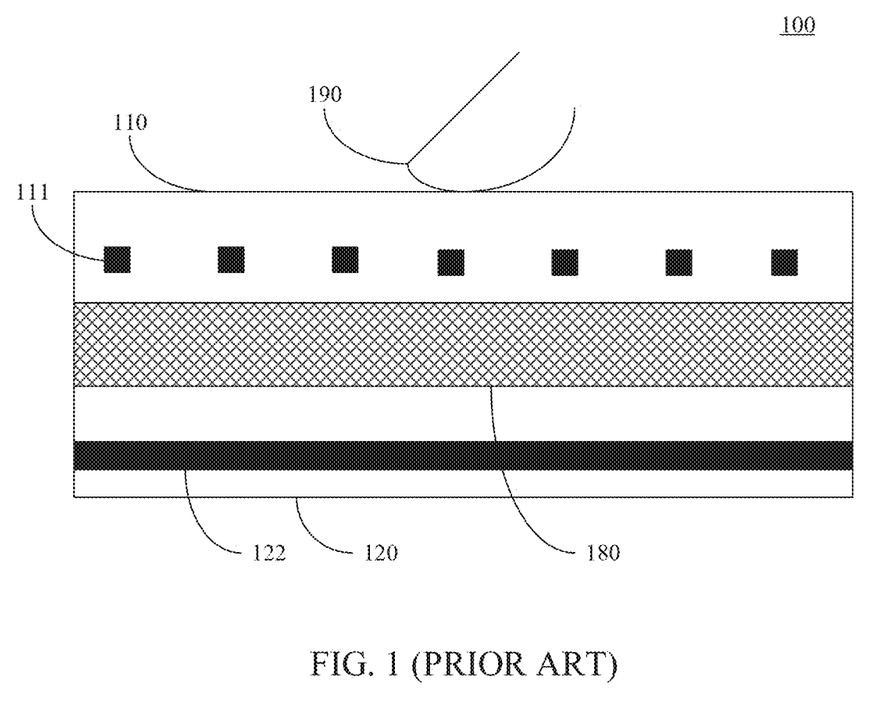
FIG. 1 illustrates a sectional diagram of a pressure sensitive structure 100 of prior art.
Figure 2:
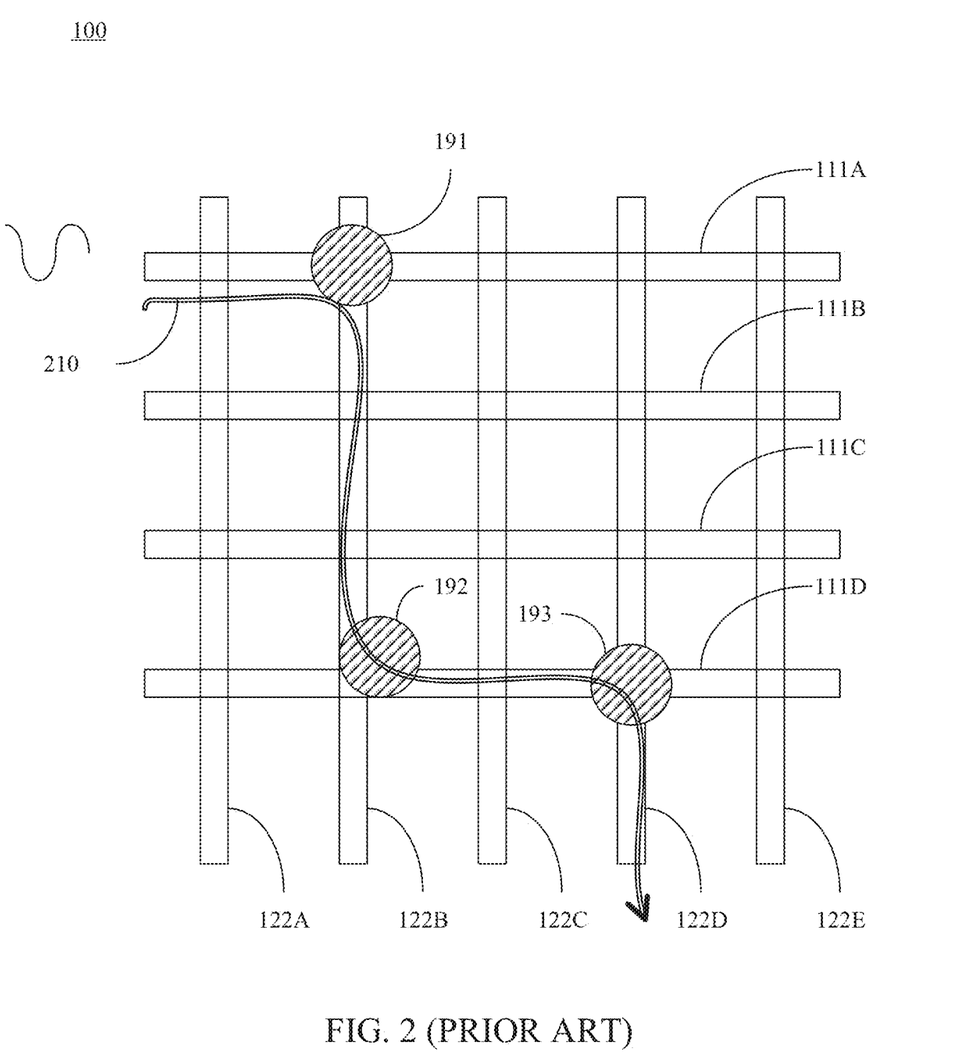
FIG. 2 depicts a top view of the pressure sensitive structure 100 as shown in FIG. 1.

Please refer to FIG. 1, which illustrates a sectional diagram of a pressure sensitive structure 100 of prior art. Please refer to FIG. 2, which depicts a top view of the pressure sensitive structure 100 as shown in FIG. 1. As shown in FIG. 1, the pressure sensitive structure 100 sequentially comprises three layers from top to bottom, a first electrode layer 110, an elastic dielectric layer 180, and a second electrode layer 120. The first electrode layer 110 includes multiple first electrodes 111 in parallel to a first axis. The first electrodes are perpendicular to the paper surface. Hence, what shown in FIG. 1 are sections of the first electrodes 111. The second electrode layer 120 includes multiple second electrodes 122 in parallel to a second axis. The second axis is the horizontal axis. Therefore, only one of the second electrodes 122 is shown in FIG. 1. The first axis as shown in FIG. 2 is the horizontal axis. The second axis as shown in FIG. 2 is the vertical axis. The first and the second axes are perpendicular. The pressure sensitive structure 100 includes four first electrodes 111A~111D and five second electrodes 122A~122E. The first electrodes 111 and the second electrodes 122 intersect each other. An intersection of one of the first electrodes 111 and one of the second electrodes 122 forms a capacitor.

As shown in FIG. 2, three points 191, 192, and 193 are pressed. Since there are pressures, the elastic dielectric layers 1800 at these three points deform accordingly. In other words, capacitances of the capacitors in the intersections around these three points would be changed as a result.

In order to detect these pressure points, it may be necessary to detect capacitance variations of the capacitors. Usually, driving signals are provided to each of the first electrodes 111 in turns, and variations of the driving signals induced by each of the second electrodes 122A~122E are detected. When there is a variation of the driving signals induced by one of the second electrodes 122, it can be determined that somewhere around an intersection of the first electrode 111 being provided with the driving signals and the second electrode 122 which induces varied driving signals is under pressure. The capacitance variation may be corresponding to magnitude of the pressure. Hence, the pressure sensitive structure 100 can be used to detect positions and magnitudes of pressed points.

As shown in FIG. 2, when the driving signals are provided to the first electrode 111A, the electric charges would flow to sensing circuits along the second electrode 122B because of presence of the pressure point 191. If there are no pressure points 192 and 193, the electric charges flow along the second electrodes 122B should reflect the capacitance variation caused by the pressure point 191.

However, when the first electrode 111D is grounded while the pressure point 192 is under pressure, a part of the driving signals would flow to the ground. As a result, it causes errors of detected pressure value. This side effect would become more serious if the impedance of the second electrode 122B goes higher. In case the first electrode 111D is floating while the pressure points 192 and 193 are applied with pressure, a part of electric charges would flow to the second electrode 122D via the first electrode 111D from the second electrode 122B. Hence, the electric charges conducted by the second electrode 122B are shared by the second electrode 122D. Under an ideal situation, variation of driving signals should not be detected via the second electrode 122D. However, the presences of the pressure points 192 and 193 leads to fake detection corresponding to the second electrode 122D by the sensing circuits. Consequently, the pressure sensitive processing apparatus mistakes to determine that somewhere around the intersection of the first electrode 111A and the second electrode 122D is also under pressure, not only the intersection of the first electrode 111A and the second electrode 122B.

Besides, it is already mentioned that pressure magnitude can be determined according to variation of capacitances. Because the electric charges of the second electrode 122B are shared by the second electrode 122D, the pressure value of the pressure point 191 is underestimated.

Hence, there exists a need of a pressure sensitive array structure and pressure sensitive processing apparatus and method thereof for preventing the electric charges leaks to irrelevant second electrodes so as the measurement of pressure value occurs errors. Thus, the measurement of position and magnitude of pressure can be more precise.

SUMMARY OF THE INVENTION

According to one embodiment of the present application, a touch panel is provided. The touch panel sequentially comprising: a first electrode layer, an elastic dielectric layer, and a second structure, the first electrode layer comprises one or more first electrodes in parallel to a first axis, the second structure comprises multiple second circuits in parallel to a second axis, multiple third circuits in parallel to the first axis, multiple second electrodes, and multiple switch circuits, wherein each of the switch circuits connects one of the second electrodes and one of the second circuits, respectively, wherein each of the switch circuits is configured to connect or disconnect the one of the second electrodes and the one of the second circuits according to signals transmitted from one of the third circuits, wherein each of the first electrodes covers at least one of the third circuits, the switch circuits configured by the at least covered one of the third circuits, and the second electrodes corresponding to the switch circuits.

Preferably, in order to simplify design of the first electrode layer, wherein the first electrode layer includes only one first electrode which covers all the second circuits, all the second electrodes, all the third circuits, and all the switch circuits.

Preferably, in order to simplify design of the second structure, wherein the second structure includes a second electrode layer, wherein the second electrodes and the second circuits are disposed on a first surface of the second electrode layer, the third and the switch circuits are disposed on a second surface of the second electrode layer, the first surface is opposite the second surface, the first surface is closer to the first electrode layer than the second surface.

Preferably, in order to simplify manufacturing processes of the second structure, wherein the second structure includes a second electrode layer and a third electrode layer, wherein the second electrodes and the second circuits are in the second electrode layer, the third circuits and the switch circuits are in the third electrode layer, the second electrode layer is closer to the first electrode layer than the third electrode layer.

Preferably, in order to have a curved or a flexible design of a touch sensitive system, wherein the first electrode layer, the elastic dielectric layer, and the second structure are flexible.

Preferably, in order to save spaces for circuits connecting to the first electrodes, wherein a number of the first electrodes is less than a number of the third circuits.

Preferably, in order to simplify design of driving the first electrodes, wherein each of the first electrodes covers N adjacent ones of the third circuits, where N is a positive integer larger than 1.

Preferably, in order to adopt to the size of finger, wherein any two adjacent one of the third circuits is larger or equals to 10 mm.

Preferably, in order to sense pressure variations by using variable resistors, wherein each of the second electrodes include a variable resistor, a first end of the variable resistor coupled to the first electrode which covers the second electrode, a second end of the variable resistor coupled to the corresponding switch circuits.

According to an embodiment of the present application, a touch sensitive processing method, applicable to the touch panel, is provided. The touch sensitive processing method comprising: with respect to each one of the third circuits, performing multiple times of pressure value array sensing step, wherein the pressure value array sensing step further comprises: controlling the switch circuits connected to the corresponding one of the third circuits close and controlling the switch circuits irrelevant to the one of third circuits open; providing driving signals to one of the first electrodes which covers the corresponding one of the third circuits; and sensing the driving signals induced by the second circuits and their connected second electrodes to gather a pressure value array; forming a pressure value image based on all the pressure value arrays according to positions of their corresponding third circuits; and calculating one or more pressure positions according to the pressure value image.

Preferably, in order to calculate a pressure value of the pressure position, wherein the touch sensitive processing method further comprise calculating a pressure value corresponding to each of the pressure positions according to the pressure value image.

According to an embodiment of the present application, a touch sensitive processing method, applicable to the touch panel, is provided. The touch sensitive processing method comprising: with respect to each one of the third circuits, performing multiple times of pressure value array sensing step, wherein the pressure value array sensing step further comprises: coupling a direct-current potential to one of the first electrodes which covers the corresponding one of the third circuits; providing driving signals to the corresponding one of the third circuits; and sensing the driving signals induced by the second circuits and their connected second electrodes to gather a pressure value array; forming a pressure value image based on all the pressure value arrays according to positions of their corresponding third circuits; and calculating one or more pressure positions according to the pressure value image.

Preferably, in order to calculate a pressure value of the pressure position, wherein the touch sensitive processing method further comprise calculating a pressure value corresponding to each of the pressure positions according to the pressure value image.

Preferably, in order to control open or close of the switch circuits more precisely, wherein the driving signals are modulated as square waves.

Preferably, in order to control open or close of the switch circuits more precisely, wherein duty cycles of the driving signals are modulable.

According to an embodiment of the present application, a touch sensitive apparatus, applicable to the touch panel, is provided. The touch sensitive apparatus comprising: an interconnection network for connecting the one or more first electrodes, the second circuits, and the third circuits, respectively; a driving circuit coupled to the interconnection network; a sensing circuit coupled to the interconnection network; and a processor, configured for executing instructions stored in non-volatile memory to realize: with respect to each one of the third circuits, performing multiple times of pressure value array sensing step, wherein the pressure value array sensing step further comprises: controlling the switch circuits connected to the corresponding one of the third circuits close and controlling the switch circuits irrelevant to the one of third circuits open; providing driving signals to one of the first electrodes which covers the corresponding one of the third circuits; and sensing the driving signals induced by the second circuits and their connected second electrodes to gather a pressure value array; forming a pressure value image based on all the pressure value arrays according to positions of their corresponding third circuits; and calculating one or more pressure positions according to the pressure value image.

Preferably, in order to calculate a pressure value of the pressure position, wherein the processor is further configured to realize calculating a pressure value corresponding to each of the pressure positions according to the pressure value image.

According to an embodiment of the present application, a touch sensitive apparatus, applicable to the touch panel, is provided. The touch sensitive apparatus comprising: an interconnection network for connecting the one or more first electrodes, the second circuits, and the third circuits, respectively; a driving circuit coupled to the interconnection network; a sensing circuit coupled to the interconnection network; and a processor, configured for executing instructions stored in non-volatile memory to realize: with respect to each one of the third circuits, performing multiple times of pressure value array sensing step, wherein the pressure value array sensing step further comprises: coupling a direct-current potential to one of the first electrodes which covers the corresponding one of the third circuits; providing driving signals to the corresponding one of the third circuits; and sensing the driving signals induced by the second circuits and their connected second electrodes to gather a pressure value array; forming a pressure value image based on all the pressure value arrays according to positions of their corresponding third circuits; and calculating one or more pressure positions according to the pressure value image.

Preferably, in order to calculate a pressure value of the pressure position, wherein the processor is further configured to realize calculating a pressure value corresponding to each of the pressure positions according to the pressure value image.

Preferably, in order to control open or close of the switch circuits more precisely, wherein the driving signals are modulated as square waves.

Preferably, in order to control open or close of the switch circuits more precisely, wherein duty cycles of the driving signals are modulable.

Preferably, in order to report sensing results of a host of the touch sensitive system, wherein the processor is further configured to realize transmitting the one or more pressure positions to a host.

According to an embodiment of the present application, a touch sensitive system is provided. The touch sensitive system comprises the touch panel, the touch sensitive processing apparatus, and the host.

According to the touch panel, the touch sensitive processing apparatus and method thereof provided by the present application, it can prevent electric charges flowing to irrelevant second electrodes which leads to sensing errors of pressure values. Thus, pressure positions and values can be sensed more precisely.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

In order to make the purpose, technical solution and advantages of the present application clearer, the technical solution of the present application will be described in detail below. Apparently, the described embodiments are only part of the embodiments of the present application, rather than comprehensive embodiments. Based on the embodiments in the present application, all other implementation manners obtained by persons of ordinary skill in the art without creative efforts fall within the protection scope of the present application.

The terms "first", "second", "third" and etc. recited in the specification, claims and drawings of the instant application are used to distinguish similar objects, not to specify a sequence or an order. It may be understood that the objects being described in that manner can be interchangeable under appropriate circumstances. In the specification of the instant application, the meaning of "a plurality" explicitly refers to two or more, unless they are specifically defined. In addition, the terms "comprise" and "include" and any other equivalents of these terms are intended to be non-exclusively. Some blocks as shown in the drawings may be functional entities, which may not directly correspond to physical or logical entities. The function entities may be implemented in a form of software, in one or more hardware circuits or integrated circuits, or in different networks, different processor devices or different micro controllers.

In the description of the instant application, it is noted that the terms "installed", "coupled" and "connecting" should be interpreted in the broadest reasonable way, unless they are otherwise defined or limited explicitly. For examples, two may be fixed connected, attachable connected, or jointly connected; mechanically connected, electrically coupled, or communicably connected; directly connected or indirectly connected via intermediates; or interconnected inside the two components or interactively correspondence of the two components. For persons having ordinary skill in the art, he/she can understand what the terms mean substantially in the specification based on the circumstances.

In order to make the purpose, features and advantages of the present application more obvious and easier to understand, below in conjunction with the figures and the specific embodiments are described in further detail to the present application.

Figure 3A:
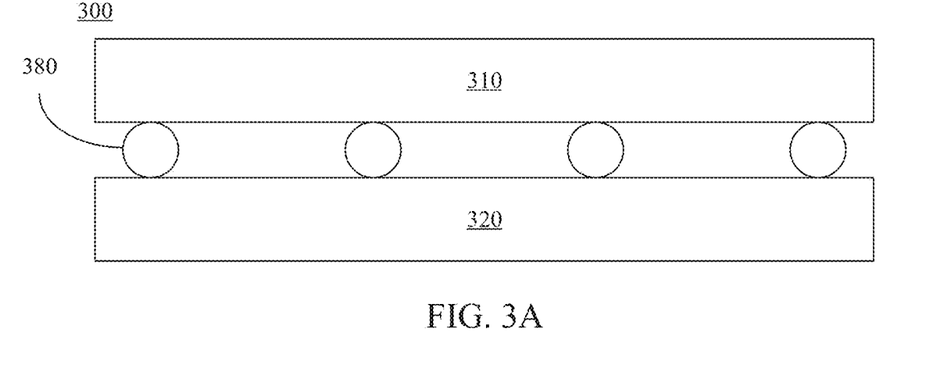
FIGS. 3A through 3C show sectional diagrams of touch panels according to embodiments of the present application.
Figure 3B:
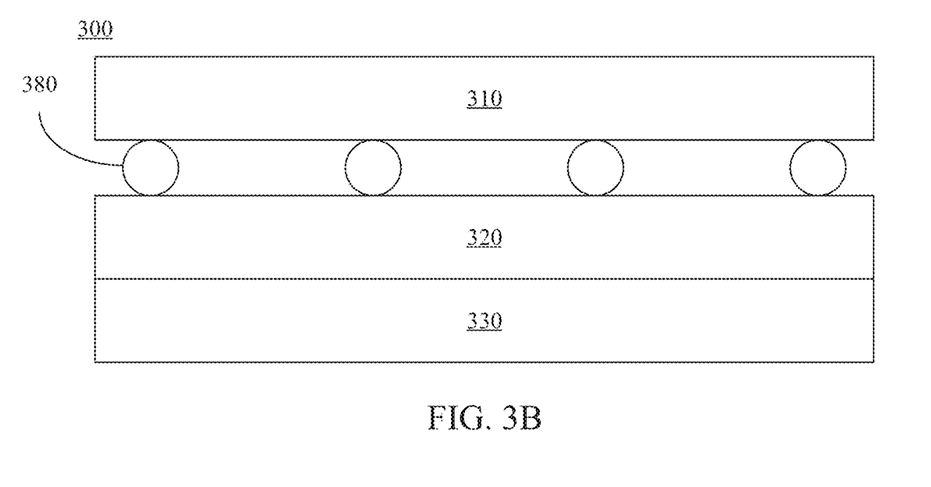
Figure 3C:
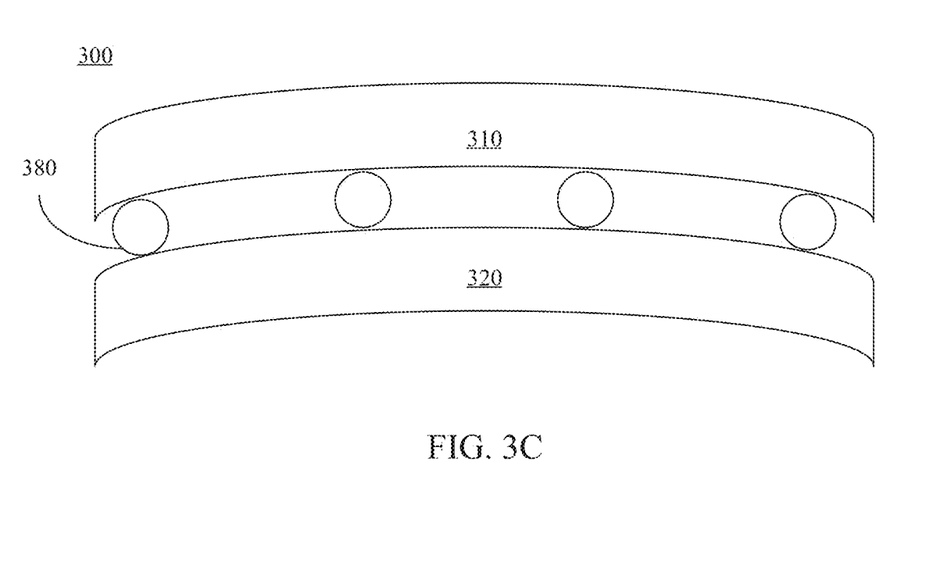

Please refer to FIGS. 3A through 3C, which show sectional diagrams of pressure sensitive array structure 300 in accordance with various embodiments of the present application, respectively. Pease refer to FIG. 4, which illustrates a top view of a pressure sensitive array structure 300 in accordance with an embodiment of the present application. As shown in FIG. 3A, the pressure sensitive array structure 300 comprises three layers. Sequentially, from top to bottom, they are a first electrode layer 310, an elastic dielectric layer 380, and a second electrode layer 320. The elastic dielectric layer 380 may comprises multiple elastic objects evenly distributed for being sandwiched between the first electrode layer 310 and the second electrode layer 320. The elastic object may be cylindrical, cuboid, or ellipsoid, etc., and not be limited to those.

When the pressure sensitive array structure 300 is pressed, the elastic objects of the elastic dielectric layer 380 would be compressed, so do spaces between the elastic objects, such that the electric capacitances in between the electrodes of the first electrode layer 310 and the electrodes of the second electrode layer 320 are changed consequently. As a result, based on the variation of sensed electric capacitances, the pressure value can be derived accordingly.

Figure 4:
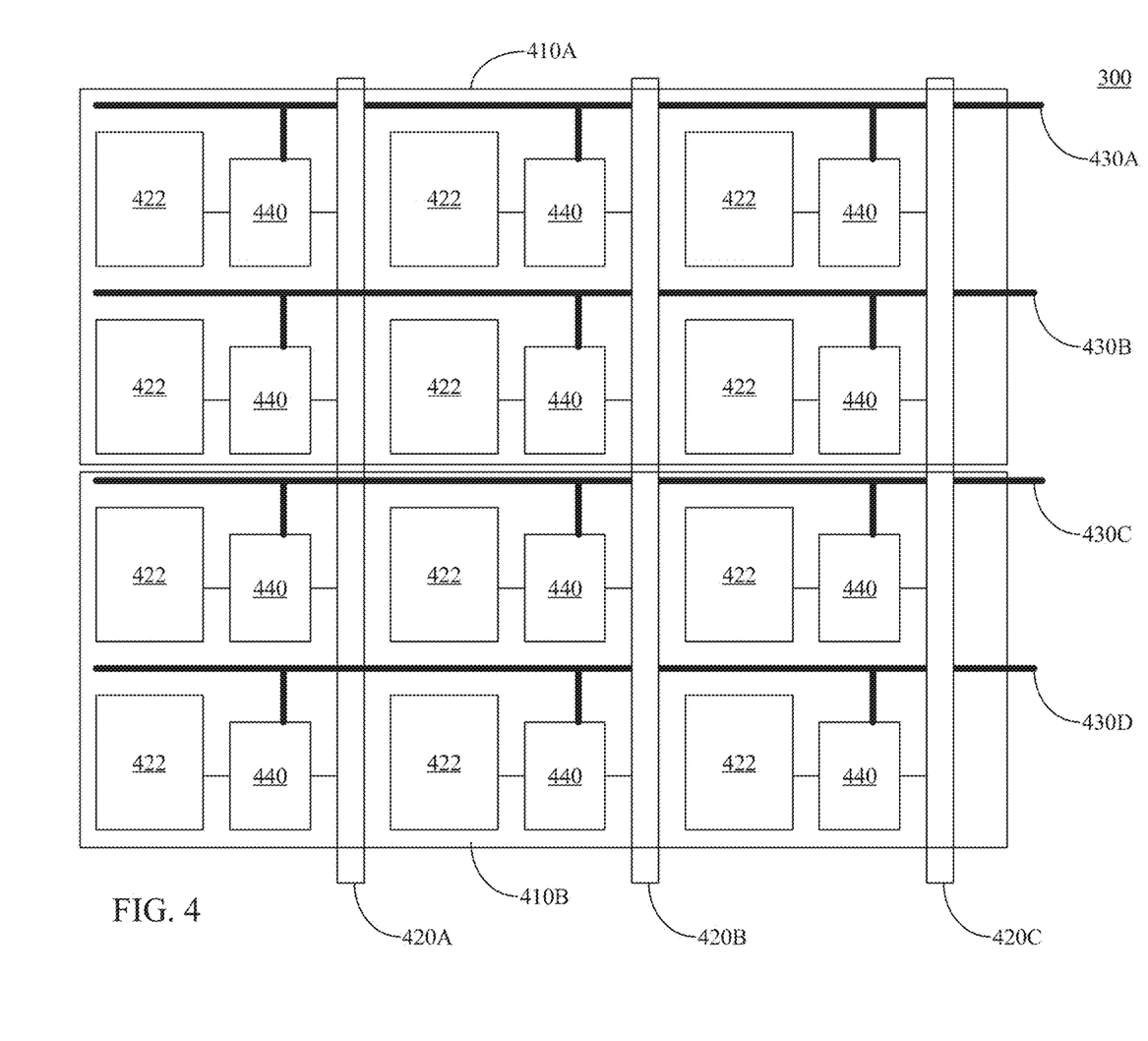
FIG. 4 shows a top view diagram of a touch panel in accordance with an embodiment of the present application.

The first electrode layer 310 may include a full-plane electrode or multiple elongated electrodes. As shown in FIG. 4, in the example of multiple elongated electrodes, the first electrode layer includes two elongated electrodes in parallel to a first axis, i.e., first electrodes 410A and 410B. The second electrode layer 320 may include multiple second circuits 420 in parallel to a second axis, multiple third circuits 430 in parallel to the first axis, multiple second electrodes 422 and multiple switch circuits 440.

The first electrode layer 310 may be a film or any elastic substrate. The first electrode(s) 410 may be disposed on an upper surface or a lower surface of the first electrode layer 310. The first electrode(s) 410 may be covered with a dielectric layer in order to prevent direct contact to foreign object or to the second electrodes 422 if being pressed. The second electrode layer 320 may be also a film, a piece of glass, or a printed circuit board etc. if the forementioned circuits and components can be disposed with. Moreover, the first electrode layer 310 and the second electrode layer 320 may be transparent or not.

In one embodiment, the second electrodes 422 and the second circuits 420 may be disposed on a first surface of the second electrode layer 320. The third circuits 430 and the switch circuits 440 may be disposed on a second surface of the second electrode layer 320. The second electrode layer 320 may include conductive vias for connecting the second electrodes 422 and the switch circuits 440, respectively. The first surface is opposite to the second surface. In an alternative embodiment, the second circuits 420, the third circuits 430, the second electrodes 422 and the switch circuits 440 may be disposed in multiple layers of a multi-layer PCT, respectively.

In an alternative embodiment, the second electrodes 422, the second circuits 420, the third circuits 430, and the switch circuits 440 may be printed circuits on a surface of the second electrode layer. The second electrodes 422, the second circuits 420, the third circuits 430, and the switch circuits 440 may be separated or isolated by dielectric materials. The first electrodes 410, the second electrodes 422, the second circuits 420, the third circuits 430, the switch circuits 440, and the dielectric materials for isolation of these components may be transparent or not.

Please refer to FIG. 3B, the pressure sensitive array structure 300 may further comprises a third electrode layer 330 underneath the second electrode layer 320. In this embodiment, the second electrodes 422 and the second circuits 420 may be disposed in the second electrode layer 320, and the third circuits 430 and the switch circuits 440 may be disposed in the third electrode layer 330. There may be interconnection circuits in between the second electrode layer 320 and the third electrode layer 330.

Please refer to FIG. 3C, when materials of the first electrode layer 310 and the second electrode layer 320 are flexible, the pressure sensitive array structure 300 may be folded or bent. For example, the pressure sensitive array structure 300 may be arranged on a curved surface with a fixed curvature.

The third circuits 430 may be used to simultaneously control multiple switch circuits 440 arranged along the first axis. When the switch circuit 440 is closed, the second electrode 422 is connected to corresponding second circuit 420. When the switch circuit 440 is opened, the second electrode 422 is not connected to corresponding second circuit 420. The switch circuit 440 may comprises but not limited to at least one transistor component, such as a field effect transistor.

The first electrodes 410 and the third circuits 430 are connected to a driving circuit module of a pressure sensitive processing apparatus, respectively. The second circuits 420 are connected to a sensing circuit module of the pressure sensitive processing apparatus, respectively. When performing pressure sensing to an area around one of the third circuits 430, it may control the multiple switch circuits 440 corresponding to the one of the third circuits 430 such that the second electrodes 422 corresponding to the one of the third circuits 430 are connected to the second circuits 420 via the switch circuits 440, respectively. And it may provide driving signals to one of the first electrodes 410 above the third circuit 430. Because there are capacitors formed between the first electrode 410 and the second electrodes 422, the driving signals induced by the second electrodes 422 may be transmitted to the sensing circuit module via the second circuits 420, respectively.

After pressure sensing on the one of the third circuits 430, a pressure value array can be gathered. The number of elements of the pressure value array is the number of the second circuits 420. Following that, a next one of the third circuits 430 may be chosen for pressure sensing to gather another pressure value array. When pressure sensing is performed on all the third circuits 430, respectively, it represents that the pressure sensing of the entire pressure sensitive array structure is completed. Next, a pressure value image can be formed by the pressure value arrays according to positions of their corresponding third circuits 430. The vertical element number of the pressure value image is the number of the third circuits 430. The horizontal element number of the pressure value image is the number of the second circuits 420.

It may compare the pressure value image with a baseline image which is sensed when no pressure is presented to generate a difference image. Following that, based on the difference image, one or more areas affected by pressure may be found. Next, finding a gravity center or a geometric center of each of the areas as a pressure position corresponds to the area. At last, an average of the sensed pressure values nearby the pressure position weighted by their distances between the sensed point and the pressure position may be taken as a pressure value of the pressure position. Person having ordinary skill in the art can understand that the method for obtaining pressure position and pressure value corresponding to the pressure position is well-known. Algorithms provided by the prior art as shown in FIGS. 1 and 2 may be applicable.

Because the switch circuits are closed only when pressure sensing being performed on their corresponding second electrodes 422, the problem occurred to the prior art as shown in FIG. 2 can be prevented. Please refer to FIG. 5, which depicts a flow diagram of electric charges in accordance with an embodiment with multiple pressure points of the present application. When performing pressure sensing on the second electrodes 422 corresponding to the third circuit 430A, only a first row of the switch circuits 440 corresponding to the third circuit 430A are closed. When it is pressed at the pressure point 195, the electric charges brought by the driving signals 510 would flow to the second electrodes 422 corresponding to the pressure point 195 along the first electrode 410A. These electric charges would flow to the second circuit 420A via corresponding switch circuit 440 and enter the sensing circuit module in the end.

Figure 5:
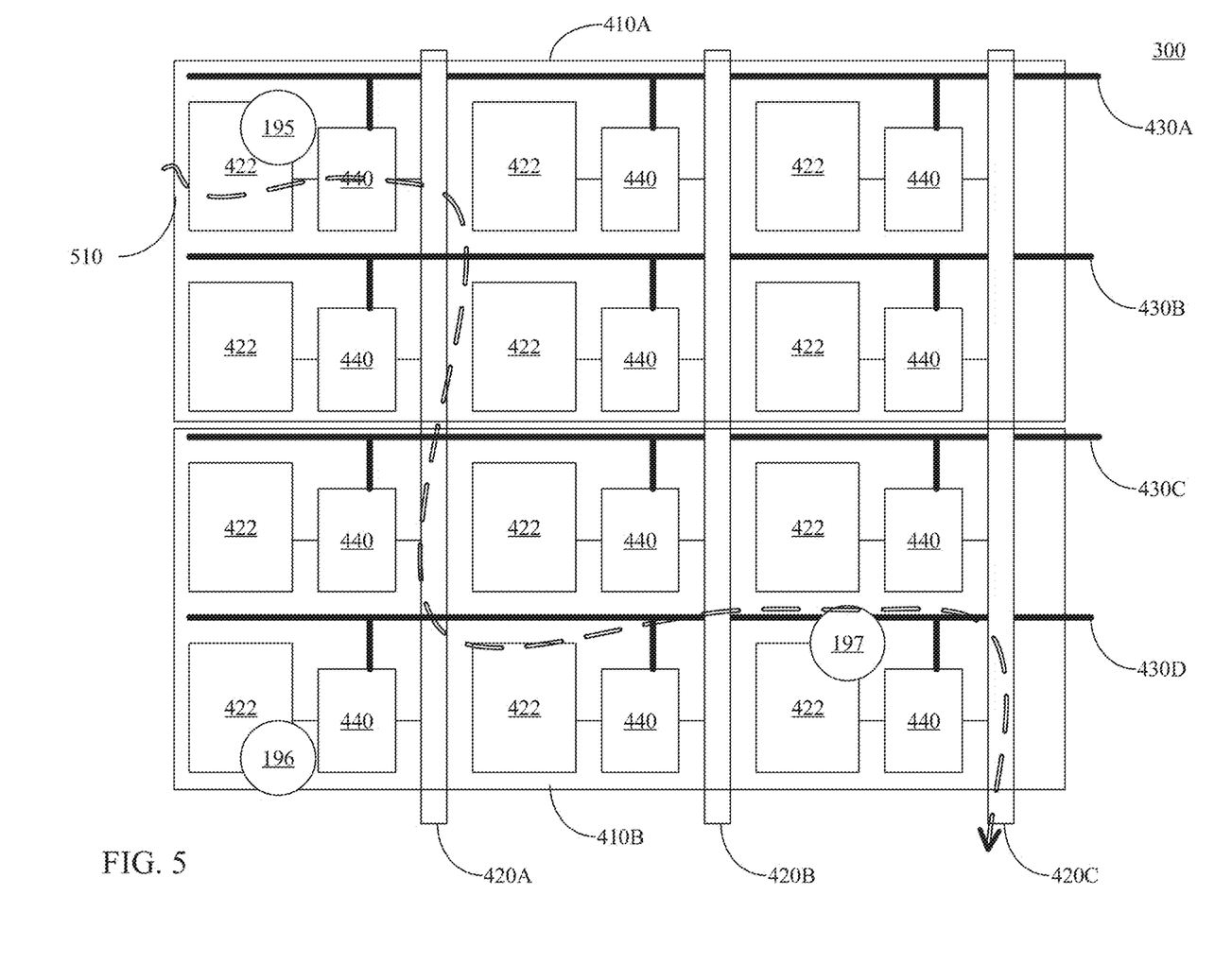
FIG. 5 depicts a flow diagram of electric charges in accordance with an embodiment with multiple pressure points of the present application.

Although the pressure points 196 and 197 changes capacitances between their corresponding second electrodes 422 and the first electrode 410B, due to the openness of the switch circuits 440 corresponding to these two second electrodes 422, the electric charges would not flow to the second electrodes 422 via the second circuit 420A and not flow further to the second electrode 422 corresponding to the pressure point 197 via the first electrode 410B. Moreover, the switch circuit 440 corresponding to the pressure point 197 is also opened, it reduces or eliminates the electric charges flows to the second circuit 420C from the second electrode 422. Due to the openness of the switch circuits 440, electric charges of the driving signals 510 are not allowed to flow to the irrelevant second circuit 420C. Hence, the problem occurred to the prior art can be prevented so as pressure sensing via the second circuit 420A on the pressure point 195 is more precise.

Figure 6:
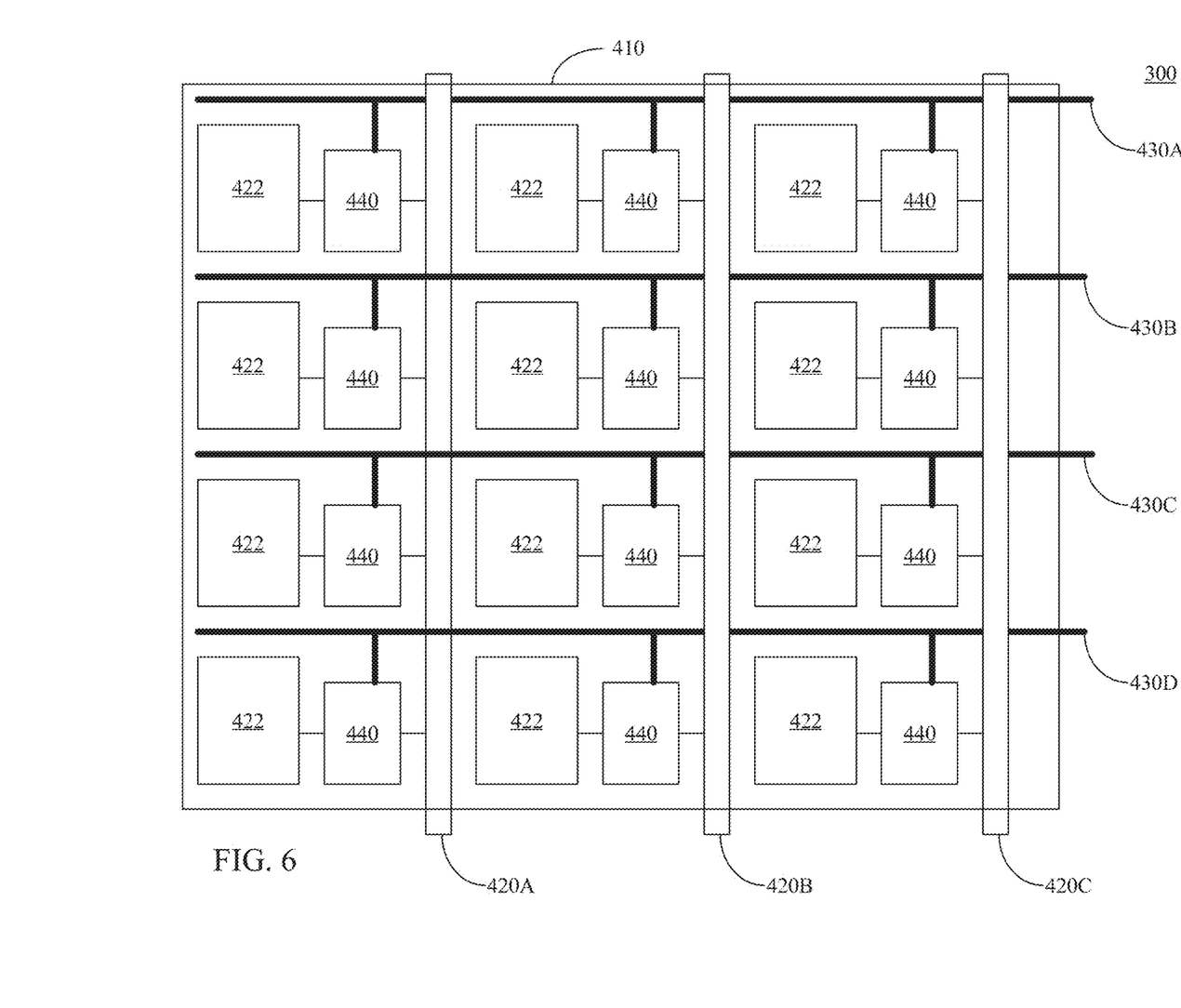
FIG. 6 illustrates a variant of the embodiment as shown in FIG. 4.

Please refer to FIG. 6, which illustrates a variant of the embodiment as shown in FIG. 4. The pressure sensitive array structure 300 as shown in FIG. 6 only includes one first electrode 410 which overlaps all the second electrodes 422. Because the switch circuits 440 which are irrelevant to the third circuit 430 being sensed can be configured as open, the driving signals induced by the second electrodes 422 cannot be transmitted to the second circuits 420 by the irrelevant switch circuits 440. This is the reason of having only one first electrode 410 for overlapping all the second electrodes 422. As a result, multiple interconnection circuits to multiple first electrodes 410 can be omitted, manufacture process can be shorted, cost and space for allocating circuits can be reduced.

Figure 7:
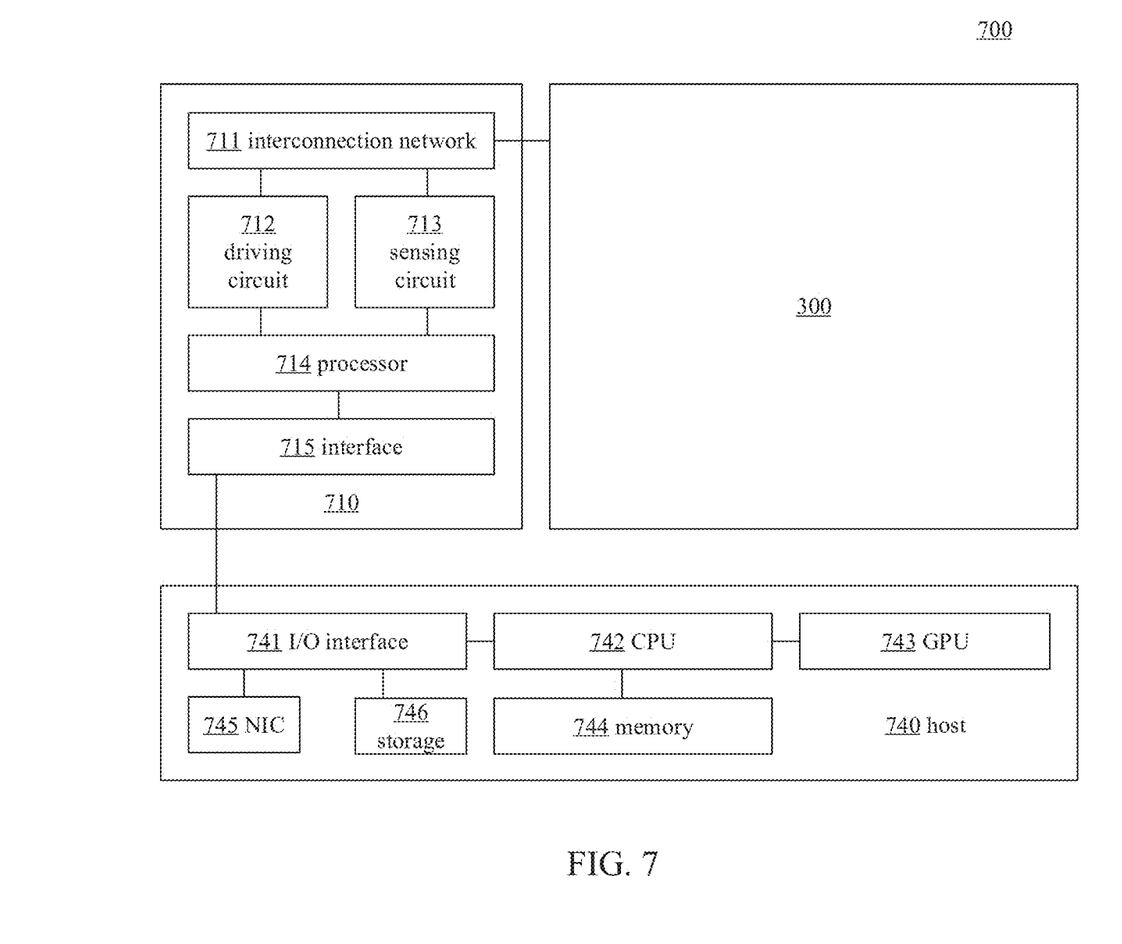
FIG. 7 depicts a block diagram of a touch sensitive system 700 in accordance with an embodiment of the present application.

Please refer to FIG. 7, which depicts a block diagram of a touch sensitive system 700 in accordance with an embodiment of the present application. The touch sensitive system 700 may be a common desktop, laptop, tablet personal computer, industrial control computer, smartphone or any other computer system fulfilling touch sensitive functions.

The touch sensitive system 700 may comprise a touch sensitive processing apparatus 710, a touch panel 300 which connects to the touch sensitive processing apparatus 710, and a host 740 which connects to the pressure sensitive processing apparatus. The touch sensitive system 700 may further comprise one or more styli 730 and/or one or more touch board erasers 735.

The touch sensitive processing apparatus 710 may comprise following hardware circuit modules: an interconnection network module 711, a driving circuit module 712, a sensing circuit module 713, a processor module 714, and an interface module 715. The touch sensitive processing apparatus 710 may be implemented in a single chip of integrated circuits, which may encapsulate one or more dies. The touch sensitive processing apparatus 710 may be implemented by multiple chips of integrated circuits and a circuit board connecting these chips. The touch sensitive processing apparatus 710 may be implemented in the same chip which comprise the host 740. In other words, the application does not limit how the touch sensitive processing apparatus 710 implements.

The interconnection network module 711 is configured to connect one or more first electrodes 410, the second circuits 420, and the third circuits 430 of the touch panel 300, respectively. The interconnection network module 711 may receive control commands of the processor module 714 for connecting the driving circuit module 712 with any one or more first electrodes 410, the second circuits 420 and the third circuits 430. The interconnection network module 711 may comprise a combination of one or more multiplexers to fulfill the mentioned functions.

The driving circuit module 712 may comprise clock generator, frequency divider, frequency multiplier, phase lock loop, power amplifier, DC-DC voltage converter, regulator and/or filter, which is configured to provide driving signal to any one or more first electrodes 410, the second circuits 420, and the third circuits 430 via the interconnection network module 711 according to control commands of the processor module 714. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 712 may include one or more channel. Each channel may be connected to any one or more first electrodes 410 and the third circuits 430 via the interconnection network module 711.

The sensing circuit module 713 may comprise integrator, sampler, clock generator, frequency divider, frequency multiplier, phase lock loop, power amplifier, operational amplifier, DC-DC voltage converter, regulator and/or filter, which is configured to sense on any one or more touch electrodes via the interconnection network module 711 according to control commands of the processor module 714. When the touch signal is transmitted from one of the touch electrodes, another touch electrode may induce the touch signal. And the sensing circuit module 730 may demodulate the induced touch signal by the another touch electrode in accordance with the modulation method performed on the driving signal by the driving circuit module 712 in order to restore the messages carried by the driving signal. The sensing circuit module 713 may include one or more channels. Each channel may be connected to any one or more second circuits 420 via the interconnection network module 711. At the same time, each channel may simultaneously perform sensing and demodulation.

In one embodiment, the driving circuit module 712 and the sensing circuit module 713 may include analog front-end (AFE) circuits. In another embodiment, in additional to the AFE circuits, the driving circuit module 712 and the sensing circuit module 713 may include digital back-end (DBE) circuits. If the driving circuit module 712 and the sensing circuit module 713 include only the AFE circuits, the DBE circuits may be implemented in the processor module 714.

The processor module 714 may include a digital signal processor for connecting the AFE circuits or the DBE circuits of the driving circuit module 712 and the sensing circuit module 713, respectively. The processor module 714 may include an embedded processor, non-volatile memories, and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 711, the driving circuit module 712, the sensing circuit module 713 and the interface module 715 of the pressure sensitive processing apparatus 710. For examples, the processor 714 may comprises processors widely adopted in the industry such as 8051 series, Intel i960 series, ARM Cortex-M series and etc. The present application does not limit types and numbers of processor cores included in the processor module 714.

The instructions and data may be used to implement each of steps mentioned in the present application and flows and methods constructed by the steps. Some instructions may be executed independently inside the processor module 714, for examples, arithmetic and log operation instructions. Other instructions may be used to control other circuits of the touch sensitive processing apparatus 710. These instructions may include input/output interfaces of the processor module 714 to control other circuits. Other circuits may provide information via the input/output interface of the processor module 714 to the OS and/or application programs executed by the processor module 714. Persons having ordinary skill in the art should have common knowledge of computer organization and architecture which enabling them to understand that the flows and methods provided by the present application can be realized by the circuits and the instructions.

The interface module 715 may include kinds of serial or parallel bus, such as universal serial bus (USB), I²C, peripheral component interconnect (PCI), PCI-Express, IEEE 1394 and other industrial standard input/output interface. The touch sensitive processing apparatus 710 connects to the host 740 via the interface module 715.

The host 740 is a main apparatus for controlling the touch sensitive system 700. It may comprise an input/output interface module 741 for connecting the interface module 715, a central processing unit (CPU) module 742, a graphics processor module 743, a memory module 744 connects to the CPU module 742, a network interface module 745 and a storage module 746 connect to the input/output interface module 741.

The storage module 746 comprises non-volatile memory. Common examples are hard disks, electronic erasable rewritable read only memory (EEPROM), or flash memory. The storage module 746 may store normal operating system and application programs executable under the operating system. The network interface module 745 may comprise wired or wireless hardware network interface. The network interface module 745 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 742 may directly or indirectly connects to the input/output interface module 741, the graphics processor module 743, the memory module 744, the network interface module 745 and the storage module 746. The CPU module 742 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 742 is able to control other modules of the touch sensitive system 700.

The optional graphics processor (GPU) module 743 is usually configured to handle computations with respect to graphics outputs. The graphics processor module 743 may connect to the touch screen 300 for controlling outputs of the touch screen 300. In some applications, the host 740 may have the CPU module 742 execute the computations with respect to graphics outputs, without dedicated handling of the graphics processor module 743.

The host 740 may comprise components or apparatus not shown in FIG. 7, for example, audio input/output interface, keyboard input interface, mouse input interface, track-ball input interface and/or any other hardware circuits. Persons having ordinary skill in the art should have common knowledge of computer organization and architecture. They can understand the touch sensitive system 700 disclosed by the present application is exemplary. Parts regarding to the inventive feature provided by the present application should be referred to the specification and the claim.

Figure 8:
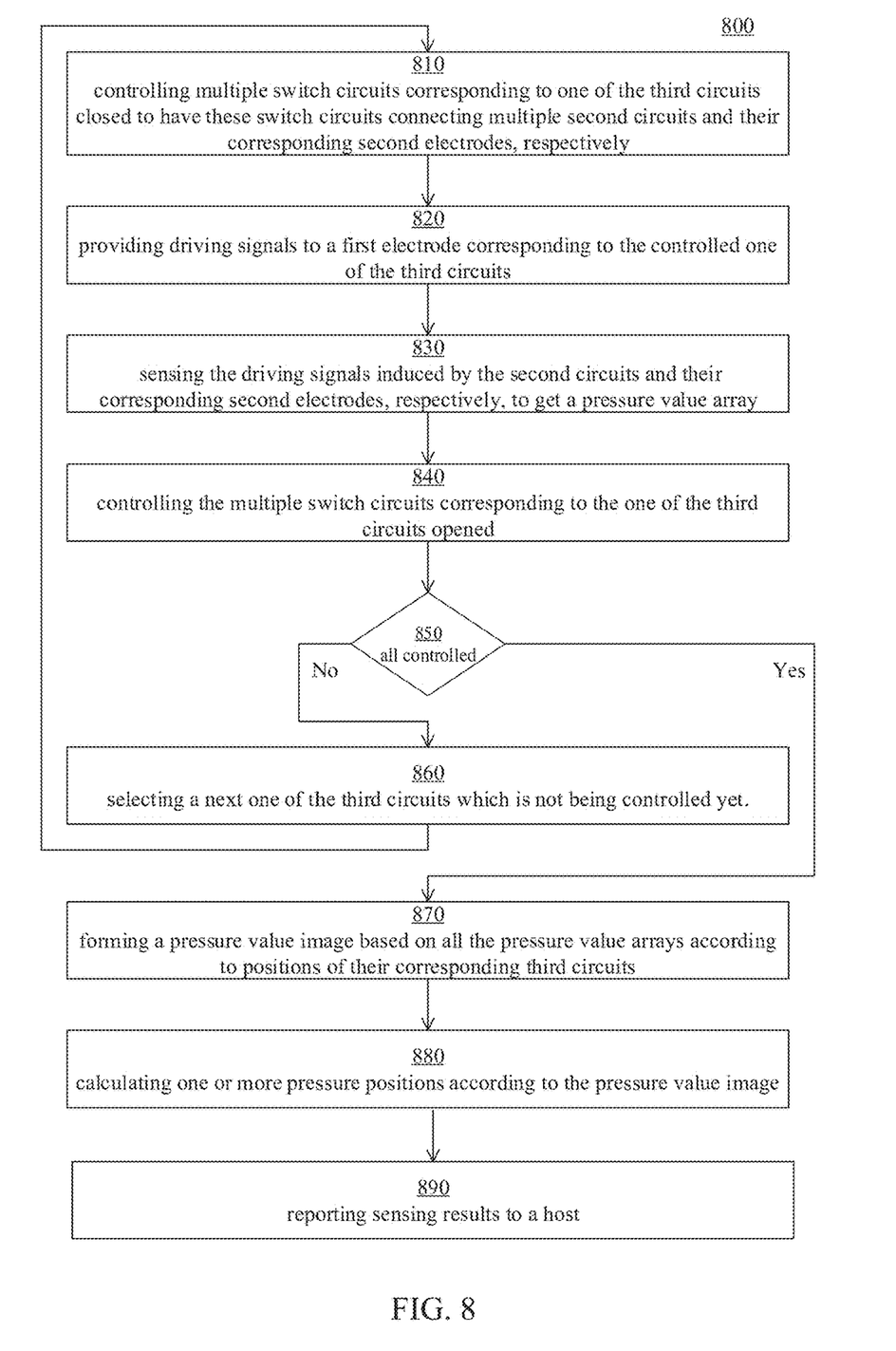
FIG. 8 depicts a flowchart diagram of a touch sensitive processing method 800 in accordance with an embodiment of the present application.

Please refer to FIG. 8, which depicts a flowchart diagram of a touch sensitive processing method 800 in accordance with an embodiment of the present application. The touch sensitive method 800 may be applicable to the touch sensitive system 700 as shown in FIG. 7, especially applicable to the processor module 714 of the touch sensitive processing apparatus 710. The processor module 714 may execute the instructions and data store in non-volatile memories to realize the touch sensitive processing method 800. If there is no causal relation between any two steps, the present application does not limit the execution sequence of these two steps. The touch sensitive processing method 800 begins with step 810.

Step 810: controlling multiple switch circuits corresponding to one of the third circuits closed to have these switch circuits connecting multiple second circuits and their corresponding second electrodes, respectively.

Step 820: providing driving signals to a first electrode corresponding to the controlled one of the third circuits.

Step 830: sensing the driving signals induced by the second circuits and their corresponding second electrodes, respectively, to get a pressure value array. Execution time periods of the steps 820 and 830 are at least partially overlapped.

Step 840: controlling the multiple switch circuits corresponding to the one of the third circuits opened.

Step 850: determining whether all the third circuits are controlled, i.e., whether all the second electrodes are sensed. If the result is negative, the flow proceeds to step 860. If the result is positive, the flow proceeds to step 870.

Step 860: selecting a next one of the third circuits which is not being controlled yet. Next, the flow returns to step 810 for performing sensing on second electrodes corresponding to the next one of the third circuits.

Step 870: forming a pressure value image based on all the pressure value arrays according to positions of their corresponding third circuits.

Step 880: calculating one or more pressure positions according to the pressure value image. The step may further comprise calculating one or more weighted pressure values of the one or more pressure positions, respectively.

Step 890: reporting sensing results to a host. The sensing results may comprise one of any combination of following: the pressure positions, the pressure values of the pressure positions, and the pressure value image.

Figure 9:
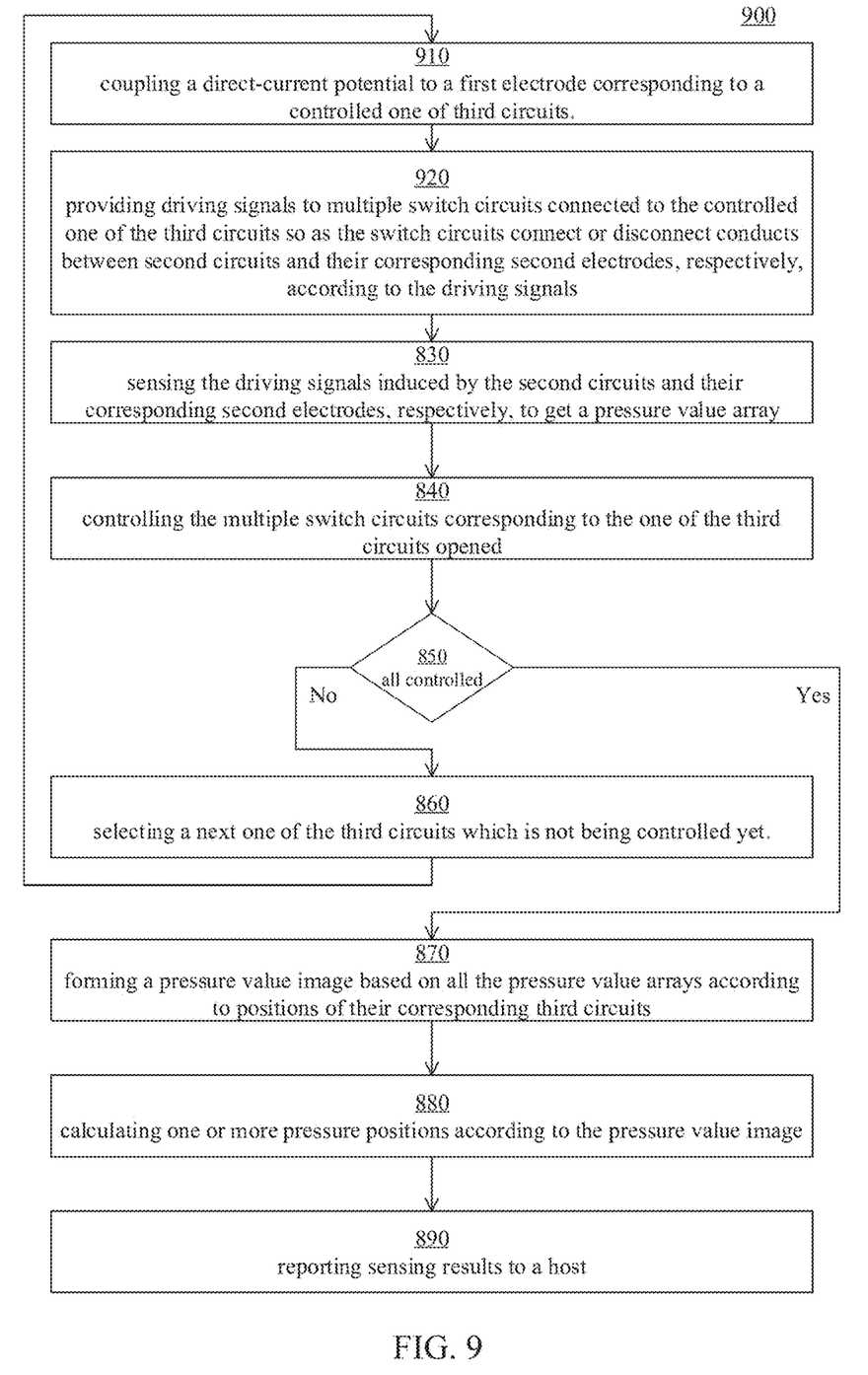
FIG. 9 depicts a touch sensitive processing method 900 according to a variant of the embodiment as shown in FIG. 8.

Please refer to FIG. 9, which depicts a touch sensitive processing method 900 according to a variant of the embodiment as shown in FIG. 8. The touch sensitive processing method 900 reuses some steps of the touch sensitive processing method 800. The difference between these two methods is how to provide potentials of the driving signals. In the touch sensitive processing method 800, the driving signals are provided to the first electrodes. In the touch sensitive processing method 900, the switch circuits are controlled to provide driving signals. The touch sensitive processing method 900 begins with step 910.

Step 910: coupling a direct-current potential to a first electrode corresponding to a controlled one of third circuits.

Step 920: providing driving signals to multiple switch circuits connected to the controlled one of the third circuits so as the switch circuits connect or disconnect conducts between second circuits and their corresponding second electrodes, respectively, according to the driving signals.

The driving signals may be square waves. When the square waves of the driving signals are at high potential, the switch circuits are closed. When the square waves of the driving signals are at low potential, the switch circuits are opened. In a reverse example, when the square waves of the driving signals are at low potential, the switch circuits are closed. When the square waves of the driving signals are at high potential, the switch circuits are opened. As a result, the induced currents between the first and second electrodes are controlled according to the driving signals. The effect is similar to the case that the driving signals are provided by the first electrodes.

In aforementioned embodiment, magnitude of pressure is sensed according to a variation of capacitance between the first and the second electrodes. In an alternative embodiment, the second electrodes may be replaced by variable resistors which reflect pressures. One end of the variable resistor is coupled to one of the first electrodes, the other end is coupled to one of the switch circuits. When under pressure, resistance of the resistor is changed accordingly. Person having ordinary skill in the art can understand the pressure sensitive array structure and pressure sensitive processing apparatus and method thereof provided by the application can be applied to the variants.

In one embodiment, a distance between two adjacent third circuits may be 10 mm or further.

According to one embodiment of the present application, a touch panel is provided. The touch panel sequentially comprising: a first electrode layer, an elastic dielectric layer, and a second structure, the first electrode layer comprises one or more first electrodes in parallel to a first axis, the second structure comprises multiple second circuits in parallel to a second axis, multiple third circuits in parallel to the first axis, multiple second electrodes, and multiple switch circuits, wherein each of the switch circuits connects one of the second electrodes and one of the second circuits, respectively, wherein each of the switch circuits is configured to connect or disconnect the one of the second electrodes and the one of the second circuits according to signals transmitted from one of the third circuits, wherein each of the first electrodes covers at least one of the third circuits, the switch circuits configured by the at least covered one of the third circuits, and the second electrodes corresponding to the switch circuits.

Preferably, in order to simplify design of the first electrode layer, wherein the first electrode layer includes only one first electrode which covers all the second circuits, all the second electrodes, all the third circuits, and all the switch circuits.

Preferably, in order to simplify design of the second structure, wherein the second structure includes a second electrode layer, wherein the second electrodes and the second circuits are disposed on a first surface of the second electrode layer, the third and the switch circuits are disposed on a second surface of the second electrode layer, the first surface is opposite the second surface, the first surface is closer to the first electrode layer than the second surface.

Preferably, in order to simplify manufacturing processes of the second structure, wherein the second structure includes a second electrode layer and a third electrode layer, wherein the second electrodes and the second circuits are in the second electrode layer, the third and the switch circuits are in the third electrode layer, the second electrode layer is closer to the first electrode layer than the third electrode layer.

Preferably, in order to have a curved or a flexible design of a touch sensitive system, wherein the first electrode layer, the elastic dielectric layer, and the second structure are flexible.

Preferably, in order to save spaces for circuits connecting to the first electrodes, wherein a number of the first electrodes is less than a number of the third circuits.

Preferably, in order to simplify design of driving the first electrodes, wherein each of the first electrodes covers N adjacent ones of the third circuits, where N is a positive integer larger than 1.

Preferably, in order to adopt to the size of finger, wherein any two adjacent one of the third circuits is larger or equals to 10 mm.

Preferably, in order to sense pressure variations by using variable resistors, wherein each of the second electrodes include a variable resistor, a first end of the variable resistor coupled to the first electrode which covers the second electrode, a second end of the variable resistor coupled to the corresponding switch circuits.

According to an embodiment of the present application, a touch sensitive processing method, applicable to the touch panel, is provided. The touch sensitive processing method comprising: with respect to each one of the third circuits, performing multiple times of pressure value array sensing step, wherein the pressure value array sensing step further comprises: controlling the switch circuits connected to the corresponding one of the third circuits close and controlling the switch circuits irrelevant to the one of third circuits open; providing driving signals to one of the first electrodes which covers the corresponding one of the third circuits; and sensing the driving signals induced by the second circuits and their connected second electrodes to gather a pressure value array; forming a pressure value image based on all the pressure value arrays according to positions of their corresponding third circuits; and calculating one or more pressure positions according to the pressure value image.

Preferably, in order to calculate a pressure value of the pressure position, wherein the touch sensitive processing method further comprise calculating a pressure value corresponding to each of the pressure positions according to the pressure value image.

According to an embodiment of the present application, a touch sensitive processing method, applicable to the touch panel, is provided. The touch sensitive processing method comprising: with respect to each one of the third circuits, performing multiple times of pressure value array sensing step, wherein the pressure value array sensing step further comprises: coupling a direct-current potential to one of the first electrodes which covers the corresponding one of the third circuits; providing driving signals to the corresponding one of the third circuits; and sensing the driving signals induced by the second circuits and their connected second electrodes to gather a pressure value array; forming a pressure value image based on all the pressure value arrays according to positions of their corresponding third circuits; and calculating one or more pressure positions according to the pressure value image.

Preferably, in order to calculate a pressure value of the pressure position, wherein the touch sensitive processing method further comprise calculating a pressure value corresponding to each of the pressure positions according to the pressure value image.

Preferably, in order to control open or close of the switch circuits more precisely, wherein the driving signals are modulated as square waves.

Preferably, in order to control open or close of the switch circuits more precisely, wherein duty cycles of the driving signals are modulable.

According to an embodiment of the present application, a touch sensitive apparatus, applicable to the touch panel, is provided. The touch sensitive apparatus comprising: an interconnection network for connecting the one or more first electrodes, the second circuits, and the third circuits, respectively; a driving circuit coupled to the interconnection network; a sensing circuit coupled to the interconnection network; and a processor, configured for executing instructions stored in non-volatile memory to realize: with respect to each one of the third circuits, performing multiple times of pressure value array sensing step, wherein the pressure value array sensing step further comprises: controlling the switch circuits connected to the corresponding one of the third circuits close and controlling the switch circuits irrelevant to the one of third circuits open; providing driving signals to one of the first electrodes which covers the corresponding one of the third circuits; and sensing the driving signals induced by the second circuits and their connected second electrodes to gather a pressure value array; forming a pressure value image based on all the pressure value arrays according to positions of their corresponding third circuits; and calculating one or more pressure positions according to the pressure value image.

Preferably, in order to calculate a pressure value of the pressure position, wherein the processor is further configured to realize calculating a pressure value corresponding to each of the pressure positions according to the pressure value image.

According to an embodiment of the present application, a touch sensitive apparatus, applicable to the touch panel, is provided. The touch sensitive apparatus comprising: an interconnection network for connecting the one or more first electrodes, the second circuits, and the third circuits, respectively; a driving circuit coupled to the interconnection network; a sensing circuit coupled to the interconnection network; and a processor, configured for executing instructions stored in non-volatile memory to realize: with respect to each one of the third circuits, performing multiple times of pressure value array sensing step, wherein the pressure value array sensing step further comprises: coupling a direct-current potential to one of the first electrodes which covers the corresponding one of the third circuits; providing driving signals to the corresponding one of the third circuits; and sensing the driving signals induced by the second circuits and their connected second electrodes to gather a pressure value array; forming a pressure value image based on all the pressure value arrays according to positions of their corresponding third circuits; and calculating one or more pressure positions according to the pressure value image.

Preferably, in order to calculate a pressure value of the pressure position, wherein the processor is further configured to realize calculating a pressure value corresponding to each of the pressure positions according to the pressure value image.

Preferably, in order to control open or close of the switch circuits more precisely, wherein the driving signals are modulated as square waves.

Preferably, in order to control open or close of the switch circuits more precisely, wherein duty cycles of the driving signals are modulable.

Preferably, in order to report sensing results of a host of the touch sensitive system, wherein the processor is further configured to realize transmitting the one or more pressure positions to a host.

According to an embodiment of the present application, a touch sensitive system is provided. The touch sensitive system comprises the touch panel, the touch sensitive processing apparatus, and the host.

According to the touch panel, the touch sensitive processing apparatus and method thereof provided by the present application, it can prevent electric charges flowing to irrelevant second electrodes which leads to sensing errors of pressure values. Thus, pressure positions and values can be sensed more precisely.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch panel, sequentially comprising:
   a first electrode layer;
   an elastic dielectric layer; and
   a second structure, wherein the second structure comprises:
   multiple second circuits in parallel to a second axis;
   multiple third circuits in parallel to the first axis;
   multiple second electrodes; and
   multiple switch circuits,
   wherein each of the switch circuits connects one of the second electrodes and one of the second circuits, respectively,
   wherein each of the switch circuits is configured to connect or disconnect the one of the second electrodes and the one of the second circuits according to signals transmitted from one of the third circuits,
   wherein each of the first electrodes covers at least one of the third circuits, the switch circuits configured by the at least covered one of the third circuits, and the second electrodes corresponding to the switch circuits,
   wherein the first electrode layer includes only one first electrode which covers all the second circuits, all the second electrodes, all the third circuits, and all the switch circuits.

2. The touch panel of claim 1, wherein the second structure includes a second electrode layer, wherein the second electrodes and the second circuits are disposed on a first surface of the second electrode layer, the third circuits and the switch circuits are disposed on a second surface of the second electrode layer, the first surface is opposite the second surface, the first surface is closer to the first electrode layer than the second surface.

3. The touch panel of claim 1, wherein the second structure includes a second electrode layer and a third electrode layer, wherein the second electrodes and the second circuits are in the second electrode layer, the third circuits and the switch circuits are in the third electrode layer, the second electrode layer is closer to the first electrode layer than the third electrode layer.

4. The touch panel of claim 1, wherein the first electrode layer, the elastic dielectric layer, and the second structure are flexible.

5. The touch panel of claim 1, wherein a number of the first electrodes is less than a number of the third circuits.

6. The touch panel of claim 1, wherein each of the first electrodes covers N adjacent ones of the third circuits, where N is a positive integer larger than 1.

7. The touch panel of claim 1, wherein any two adjacent one of the third circuits is larger or equals to 10 mm.

8. The touch panel of claim 1, wherein each of the second electrodes include a variable resistor, a first end of the variable resistor coupled to the first electrode which covers the second electrode, a second end of the variable resistor coupled to the corresponding switch circuits.

9. A touch sensitive processing method, performed on the touch panel of claim 1, wherein the touch sensitive processing method comprising:
  with respect to each one of the third circuits, performing multiple times of pressure value array sensing step, wherein the pressure value array sensing step further comprises:
    controlling the switch circuits connected to the corresponding one of the third circuits close and controlling the switch circuits irrelevant to the one of third circuits open;
    providing driving signals to one of the first electrodes which covers the corresponding one of the third circuits; and
    sensing the driving signals induced by the second circuits and their connected second electrodes to gather a pressure value array;
  forming a pressure value image based on all the pressure value arrays according to positions of their corresponding third circuits; and
  calculating one or more pressure positions according to the pressure value image.

10. The touch sensitive processing method of claim 9, further comprise calculating a pressure value corresponding to each of the pressure positions according to the pressure value image.

11. A touch sensitive processing method, performed on the touch panel of claim 1, wherein the touch sensitive processing method comprising:
  with respect to each one of the third circuits, performing multiple times of pressure value array sensing step, wherein the pressure value array sensing step further comprises:
    coupling a direct-current potential to one of the first electrodes which covers the corresponding one of the third circuits;
    providing driving signals to the corresponding one of the third circuits; and
    sensing the driving signals induced by the second circuits and their connected second electrodes to gather a pressure value array;
  forming a pressure value image based on all the pressure value arrays according to positions of their corresponding third circuits; and
  calculating one or more pressure positions according to the pressure value image.

12. The touch sensitive processing method of claim 11, further comprise calculating a pressure value corresponding to each of the pressure positions according to the pressure value image.

13. The touch sensitive processing method of claim 11, wherein the driving signals are modulated as square waves.

14. The touch sensitive processing method of claim 13, wherein duty cycles of the driving signals are modulable.

15. A touch sensitive apparatus, in conjunction with the touch panel of claim 1, comprising:
  an interconnection network for connecting the one or more first electrodes, the second circuits, and the third circuits, respectively;
  a driving circuit coupled to the interconnection network;
  a sensing circuit coupled to the interconnection network; and
  a processor, configured for executing instructions stored in non-volatile memory to realize:
    with respect to each one of the third circuits, performing multiple times of pressure value array sensing step, wherein the pressure value array sensing step further comprises:
      controlling the switch circuits connected to the corresponding one of the third circuits close and controlling the switch circuits irrelevant to the one of third circuits open;
      providing driving signals to one of the first electrodes which covers the corresponding one of the third circuits; and
      sensing the driving signals induced by the second circuits and their connected second electrodes to gather a pressure value array;
    forming a pressure value image based on all the pressure value arrays according to positions of their corresponding third circuits; and
    calculating one or more pressure positions according to the pressure value image.

16. The touch sensitive processing apparatus of claim 15, wherein the processor is further configured to realize calculating a pressure value corresponding to each of the pressure positions according to the pressure value image.

17. The touch sensitive processing apparatus of claim 15, wherein the processor is further configured to realize transmitting the one or more pressure positions to a host.

18. A touch sensitive system, comprising: the touch panel, the touch sensitive processing apparatus, and the host of claim 17.

19. A touch sensitive apparatus, in conjunction with the touch panel of claim 1, comprising:
  an interconnection network for connecting the one or more first electrodes, the second circuits, and the third circuits, respectively;
  a driving circuit coupled to the interconnection network;
  a sensing circuit coupled to the interconnection network; and
  a processor, configured for executing instructions stored in non-volatile memory to realize:
    with respect to each one of the third circuits, performing multiple times of pressure value array sensing step, wherein the pressure value array sensing step further comprises:
      coupling a direct-current potential to one of the first electrodes which covers the corresponding one of the third circuits;
      providing driving signals to the corresponding one of the third circuits; and sensing the driving signals induced by the second circuits and their connected second electrodes to gather a pressure value array;

forming a pressure value image based on all the pressure value arrays according to positions of their corresponding third circuits; and calculating one or more pressure positions according to the pressure value image.

20. The touch sensitive processing apparatus of claim 19, wherein the processor is further configured to realize calculating a pressure value corresponding to each of the pressure positions according to the pressure value image.

21. The touch sensitive processing apparatus of claim 19, wherein the driving signals are modulated as square waves.

22. The touch sensitive processing apparatus of claim 21, wherein duty cycles of the driving signals are modulable.

* * * * *